United States Patent
Smith et al.

(10) Patent No.: US 12,231,010 B2
(45) Date of Patent: *Feb. 18, 2025

(54) METHODS AND APPARATUS TO CONTROL ENGINE SPEED OF A POWER SYSTEM

(71) Applicant: Illinois Tool Works Inc., Glenview, IL (US)

(72) Inventors: Alan F. Smith, Fremont, WI (US); Richard Joyce, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,650

(22) Filed: Nov. 30, 2023

(65) Prior Publication Data

US 2024/0097543 A1    Mar. 21, 2024

Related U.S. Application Data

(63) Continuation of application No. 16/513,122, filed on Jul. 16, 2019, now Pat. No. 11,848,592.
(Continued)

(51) Int. Cl.
*F02D 29/04*    (2006.01)
*B23K 9/10*    (2006.01)
(Continued)

(52) U.S. Cl.
CPC .......... *H02K 29/14* (2013.01); *B23K 9/1075* (2013.01)

(58) Field of Classification Search
CPC ....... F02B 63/06; F02B 63/042; H02K 29/14; H02K 11/27; B23K 37/0294; B23K 9/173;
(Continued)

(56) References Cited

U.S. PATENT DOCUMENTS 6,534,958 B1 * 3/2003 Graber .................... F02D 29/06
                                                          322/11
8,115,328 B2   2/2012 Fosbinder
(Continued)

FOREIGN PATENT DOCUMENTS

KR    20180080042    7/2018

OTHER PUBLICATIONS

Int'l Search Report and Written Opinion Appln. No. PCT/US2019/042153 mailed Nov. 20, 2019 (19 pgs).

*Primary Examiner* — Gabriel Agared
(74) *Attorney, Agent, or Firm* — McAndrews, Held & Malloy, Ltd.

(57) ABSTRACT

Methods and apparatus to control engine speed of a power system are disclosed. An example power system includes: an engine; an air compressor configured to generate and store air pressure in an air storage tank based on mechanical power provided by the engine; and control circuitry configured to: monitor the air pressure in the air storage tank; determine a rate of air pressure change based on the monitoring of the air pressure; in response to the rate of air pressure change satisfying a threshold rate, incrementally increasing a speed of the engine; detecting a load on an AC auxiliary output; and in response to detecting the load on the AC auxiliary output, overriding an engine speed based on the air compressor, and controlling the speed of the engine to be the predetermined speed to output the predetermined frequency.

7 Claims, 3 Drawing Sheets

Related U.S. Application Data

(60) Provisional application No. 62/699,401, filed on Jul. 17, 2018.

(51) Int. Cl.
*B23K 9/167* (2006.01)
*B23K 9/32* (2006.01)
*H02K 11/27* (2016.01)
*H02K 29/14* (2006.01)

(58) Field of Classification Search
CPC ...... B23K 9/32; B23K 9/1006; B23K 9/1075; B23K 9/167; F02D 29/04; F02D 29/06
USPC .................................................... 318/400.04
See application file for complete search history.

(56) References Cited

U.S. PATENT DOCUMENTS

| | | | |
|---|---|---|---|
| 8,125,094 B2* | 2/2012 | Radtke | B23K 9/10 |
| | | | 290/40 R |
| 9,266,183 B2* | 2/2016 | DuVal | B23K 9/1006 |
| 10,751,827 B2* | 8/2020 | Batzler | B23K 9/1043 |
| 2010/0109586 A1 | 5/2010 | Matsui | |
| 2010/0199950 A1* | 8/2010 | Renner | F02D 41/0205 |
| | | | 123/347 |
| 2014/0091622 A1 | 4/2014 | Lucas | |
| 2015/0336197 A1 | 11/2015 | Delisio | |
| 2016/0072420 A1 | 3/2016 | Stair | |
| 2018/0252176 A1 | 9/2018 | Oguguo | |
| 2019/0128253 A1* | 5/2019 | Ihde | F04D 25/02 |

* cited by examiner

METHODS AND APPARATUS TO CONTROL ENGINE SPEED OF A POWER SYSTEM

BACKGROUND

This disclosure relates generally to work vehicles, and more particularly to methods and apparatus to control engine speed of a power system.

In general, the power output of a gasoline or diesel powered internal combustion engine is proportional to the engine speed. The engine of conventional engine-powered power sources typically runs at an idle speed such as 1500 rpm, 1800 rpm, or 2400 rpm, when the machine is not loaded. When a load is applied, the engine speed is increased to supply power to the load.

SUMMARY

Methods an and apparatus to control engine speed of a power system are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
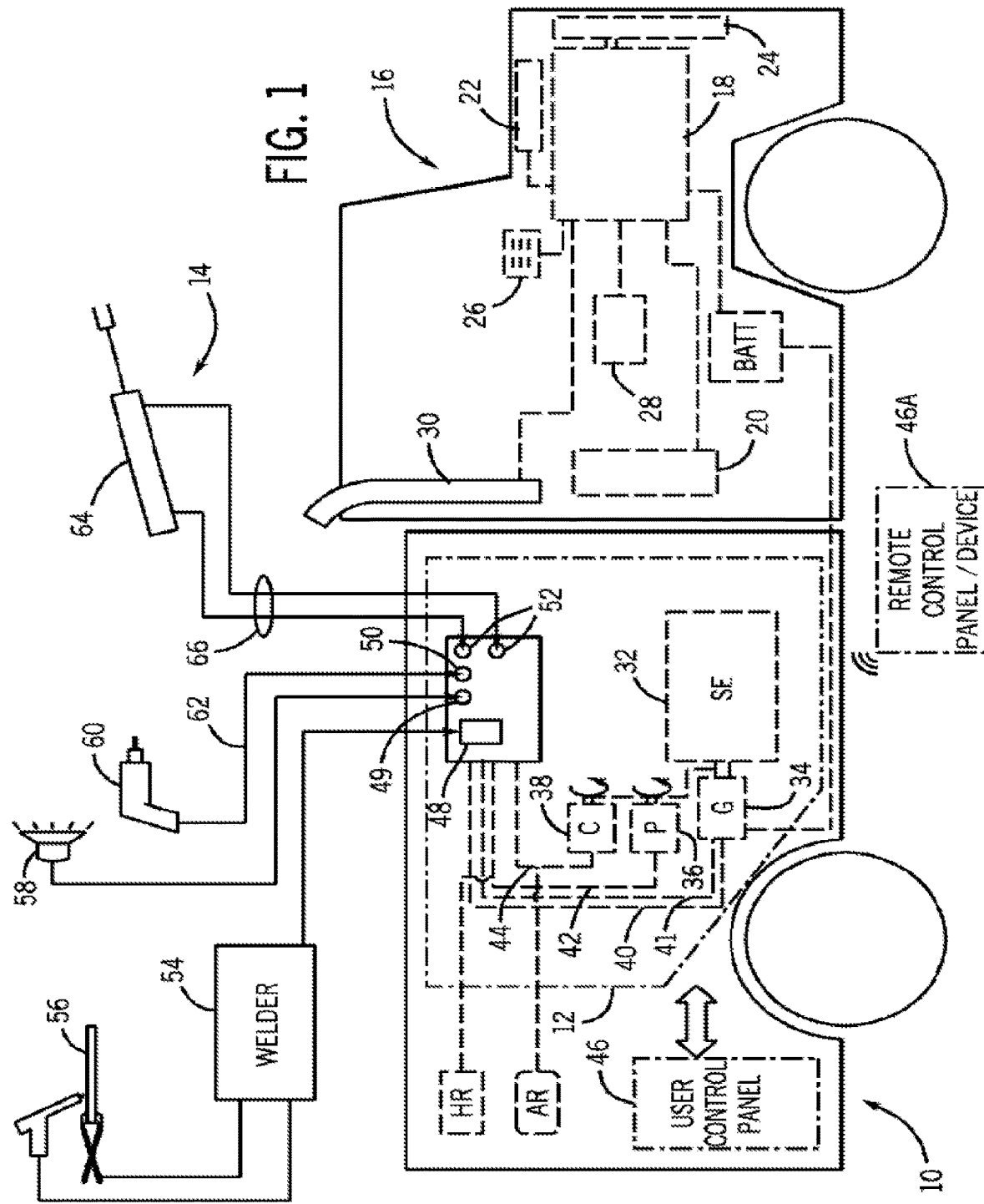
FIG. 1 is a diagrammatical overview of a work vehicle in which a service pack is installed, in accordance with aspects of the present disclosure.

Conventional engine-driven systems increase the engine speed to the full rated speed whenever any load is applied. Certain conventional loads have a limited number of predetermined intermediate engine speeds between the peak speed and the idle speed. The operating speed is determined by calculating the output power, such as weld power and selecting the appropriate speed based on the power requirements. Welding loads tend to be difficult to accurately calculate the power as the output current and voltage fluctuate. And other conditions such as stick welding hot start may give a higher power than the steady state welding power, which could cause the engine to go to a higher operating speed than is actually required for the steady state load. Disclosed example power systems do not use load power requirements to determine the required engine speed, and do not use predetermined intermediate operating speeds. Disclosed example power systems control the engine operating speed based on load-related factors, and control the engine speed throughout the range of operational speeds.

Disclosed examples involve engine-driven power systems that have an air compressor output(s), weld output(s), auxiliary power output(s), and/or battery charge output(s). Example power systems include an engine speed control for air compressor loads and/or an engine speed control for welding/battery charge loads.

In conventional air compressor systems, an air compressor driven by the engine builds air pressure in a storage tank to a set pressure, which may be user-selectable or preset. When stored air is used, such as by operating a tool powered by air pressure, the stored pressure begins to drop. Disclosed example power systems include a pressure transducer to monitor the air pressure. The power system samples the pressure at a sampling interval (e.g., every second) and calculates the rate of pressure drop of the stored air. When the rate of pressure drop exceeds a threshold rate, the engine speed is increased in small increments. As the engine speed is incremented, the rate of pressure drop begins to decrease. As the rate of pressure drop decreases the amount of engine speed increase is decreased until the rate of pressure drop is zero, at which point the engine speed is a speed sufficient to supply the given air load. If the air load were to increase, the system would again detect a drop in pressure and would further increment the engine speed as needed.

Disclosed example power systems include a switched-mode power supply to produce welding and/or non-welding electrical power (e.g., battery charging power), supplied by the engine via a generator. Such switched-mode power supply systems are also referred to as inverter-based welding-type systems. An example nominal operating speed to produce 240 volt, 60 Hz power via the generator is 3600 rpm. When the engine runs at a reduced speed, such as an idle speed of 2400 rpm, the generator voltage and frequency are reduced in proportion to the speed. Disclosed example switched-mode power supplies include an input boost converter, which maintains an internal bus voltage at 400 volts DC substantially independent of the input voltage and frequency.

Example power systems monitor the input current to the switched-mode power supply input current. As a load is applied to the switched-mode power supply, the input current increases in proportion to the load. The switched-mode power supply has a rated input current, above which stress to components such as the input rectifier may occur due to overheating. As the input current increases above the rated level to supply the output load, the engine speed is increased to increase the voltage from the generator which is supplying the switched-mode power supply. As the voltage supplying the inverter increases, the current decreases. As the inverter input current gets closer to the rated value, the rate of engine speed increase is decreased until the engine reaches a speed that supplies the necessary generator voltage to maintain the switched-mode power supply input current the desired value (e.g., the rated value).

For both an air compressor load and an electrical load, the engine speed of example power systems can be any speed in the working range of the engine. When multiple loads such as an air load and a welding load are applied, the engine speed may be automatically set to the maximum speed. Additionally, to achieve the expected AC frequency for auxiliary power loads, the engine is also automatically set to 3600 rpm when an auxiliary power load is present.

Disclosed example power systems include; an engine; a generator configured to generate electrical power from mechanical power delivered by the engine; a switched-mode power supply configured to convert the electrical power from the generator to output power; and control circuitry configured to: monitor an input current to the switched-mode power supply: and in response to the input current exceeding a threshold current, incrementally increasing a speed of the engine.

In some example power systems, the switched-mode power supply is configured to output at least one of welding-type power or battery charging power. In some examples, the generator is configured to output AC power at a predetermined voltage and a predetermined frequency, and the control circuitry is configured to: detect an AC load at the predetermined voltage and the predetermined frequency; and in response to detecting the AC load, controlling the speed of the engine to be a predetermined speed to output the predetermined frequency.

In some example power systems, the switched-mode power supply includes a boost converter stage configured to output a target voltage using the electrical power from the generator over a range of input voltages to the switched-mode power supply. In some examples, the control circuitry is configured to incrementally increase the speed of the engine until the input current is within a threshold range of the threshold current.

In some example power systems, the control circuitry is configured to incrementally increase the speed of the engine in increments between 1 and 100 revolutions per minute. In some examples, the control circuitry is configured to incrementally increase the speed of the engine in increments between 10 and 50 revolutions per minute. In some examples, the control circuitry is configured to incrementally increase the speed of the engine in increments between 10 and 20 revolutions per minute.

Some other disclosed example power systems include: an engine; an air compressor configured to generate and store air pressure in an air storage tank based on mechanical power provided by the engine; and control circuitry configured to: monitor the air pressure in the air storage tank; determine a rate of air pressure change based on the monitoring of the air pressure; and in response to the rate of air pressure change satisfying a threshold rate, incrementally increasing a speed of the engine.

Some examples further include a pressure transducer to repeatedly measure the air pressure in the air storage tank at a sampling interval. In some examples, the rate of air pressure change includes a rate of air pressure drop, the control circuitry configured to increase the speed of the engine until the rate of air pressure drop is less than the threshold rate. In some examples, the threshold rate is 0 pounds per square inch of pressure drop per unit time. Some example power systems further include: a generator configured to generate electrical power from the mechanical power delivered by the engine: and a switched-mode power supply configured to output AC power at a predetermined voltage and a predetermined frequency from the electrical power, in which the control circuitry configured to: detect an AC load at the predetermined voltage and the predetermined frequency: and in response to detecting the AC load, controlling the speed of the engine to be a predetermined speed to output the predetermined frequency.

In some example power systems, the control circuitry is configured to decrease the speed of the engine based on determining that the air pressure in the air storage tank satisfies a pressure threshold. In some examples, the control circuitry is configured to incrementally increase the speed of the engine in increments between 1 and 100 revolutions per minute. In some examples, the control circuitry is configured to incrementally increase the speed of the engine in increments between 10 and 50 revolutions per minute. In some example power systems, the control circuitry is configured to incrementally increase the speed of the engine in increments between 10 and 20 revolutions per minute.

Some other disclosed example power systems include: an engine: a generator configured to generate electrical power from mechanical power delivered by the engine; an air compressor configured to generate and store air pressure in an air storage tank using the electrical power or the mechanical power; a switched-mode power supply configured to convert the electrical power from the generator to output power; and control circuitry configured to: monitor the air pressure in the air storage tank; determine a rate of air pressure change based on the monitoring of the air pressure; monitor an input current to the switched-mode power supply; and in response to the input current exceeding a threshold current or the rate of air pressure change satisfying a threshold rate, incrementally increasing a speed of the engine.

In some example power systems, the switched-mode power supply is configured to output AC power at a predetermined voltage and a predetermined frequency, and the control circuitry is configured to: detect an AC load at the predetermined voltage and the predetermined frequency; and in response to detecting the AC load, control the speed of the engine to be a predetermined speed to output the predetermined frequency. In some examples, the control circuitry is configured to incrementally increase the speed of the engine in increments between 1 and 100 revolutions per minute.

Turning now to the drawings, and referring first to FRI 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. As used herein, the terms "power system," "service pack" and "auxiliary power unit" refer to an engine driven power source which may be auxiliary or supplemental to a primary power source such as a vehicle engine. The work vehicle 10 has a main vehicle power plant 16 based around a vehicle engine 18, Example work vehicle engines of this type may be diesel engines, gasoline engines, and/or mixed ethanol-gasoline engines.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain examples may use gasoline, diesel, natural gas, liquid petroleum gas, and/or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw air compressor or a reciprocating compressor based upon one or more reciprocating pistons.

The systems of the service pack 12 will include appropriate conduits, wiring, tubing and so forth for conveying the service generated by these components to an access point, Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC and/or 24 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46, The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 110 VAC and/or 220 VAC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1, For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding, Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site, Once located at the service site, the vehicle may be parked at a convenient location, and the main engine 18 may be shut down. The service engine 32 may then be powered, to provide service from one or more of the service systems described above, Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack, One or more of the services provided by the work vehicle 10 may be performed without the need to operate the main vehicle engine at a service site.

Figure 2:
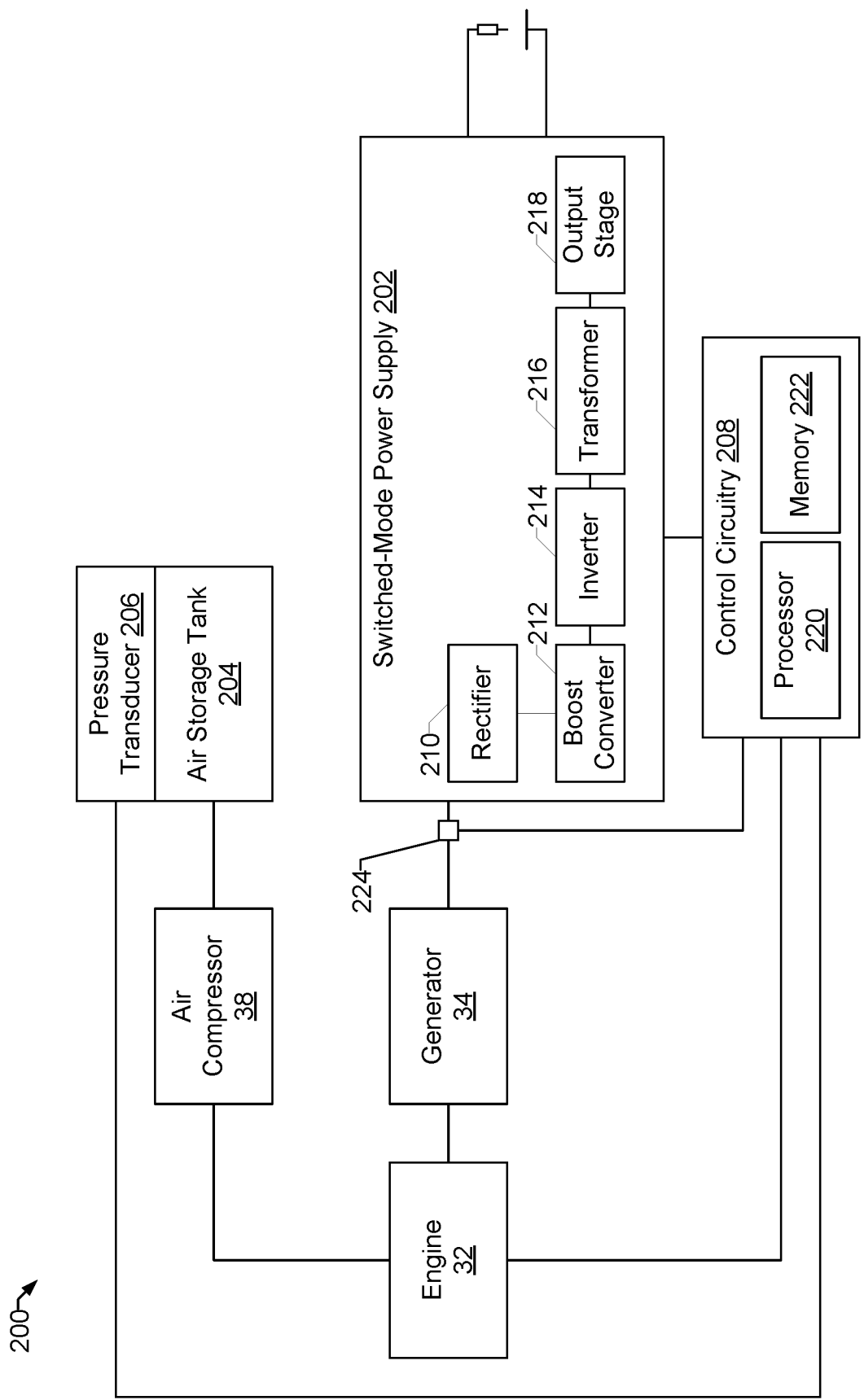
FIG. 2 is a block diagram of an example power system that may be used to implement the service pack of FIG. 1.

FIG. 2 is a block diagram of an example power system 200 that may be used to implement the service pack 12 of FIG. 1. The example power system 200 includes the service engine 32, the generator 34, the air compressor 38, a switched-mode power supply 202, an air storage tank 204, a pressure transducer 206, and control circuitry 208.

The switched-mode power supply 202 converts the electrical power from the generator 34 to output power. Generally, the switched mode power supply 202 includes a rectifier 210, a boost converter 212, an inverter 214, a transformer 216, and an output stage 218. However, other configurations of the switched-mode power supply 202 may be used. The output power may include welding-type power, and/or non-welding AC and/or DC electrical power (e.g., DC battery charging power). In some examples, the generator 34 outputs AC power at a predetermined voltage (e.g., 115 VAC, 240 VAC) and a predetermined frequency (e.g., 50 Hz, 60 Hz, 400 Hz).

The control circuitry 208 includes one or more processor(s) 220 and a machine readable memory 222 or other storage device to store instructions for execution by the processor(s) 220. The example control circuitry 208 controls the output of the switched-mode power supply 202 based on the desired load or task, and controls the speed of the engine 32 to control an input to the switched-mode power supply 202 (via the generator 34). For example, the control circuitry 208 may control switching elements of the boost converter 212 and/or the inverter 214 stages to control voltage, current, frequency, and/or other characteristics of the output from the switched-mode power supply 202. The control circuitry 208 may control the switched-mode power supply 202 to provide voltage-controlled welding power, current-controlled welding power, battery-charging power, AC power for electrical tools, and/or any other type of welding-type and/or non-welding-type electrical power.

The control circuitry 208 further controls the speed of the engine 32 based on the load on the engine 32. For example, the control circuitry 208 controls the engine 32 to be at an idle speed when the load on the engine 32 is less than a threshold load. As the control circuitry 208 identify an increase in the load, the control circuitry 208 incrementally increases the engine speed.

The air compressor 38 provides air pressure to the air storage tank 204, from where the air pressure is output to operate pneumatic tools. The pressure transducer 206 monitors the pressure in the air storage tank 204. For example, the pressure transducer 206 may sample the pressure in the air storage tank 204 at a sampling interval (e.g., 1 second, 2 seconds, etc.), and provide the air pressure to the control circuitry 208. The control circuitry 208 determines a rate of change of the air pressure in the air storage tank 204.

If the rate of change of the air pressure satisfies a threshold (e.g., the rate of change of the air pressure is less than 0, or indicates that the air pressure is decreasing), the control circuitry 208 may increase the speed of the engine 32 to increase the rate at which the air compressor 38 supplies air to the air storage tank 204. In the example of FIG. 2, instead of selecting preset engine speeds, the control circuitry 208 modifies the speed of the engine 32 incrementally. Example increments may be between 1 and 100 rotations per minute (RPM), between 10 and 50 RPM, and/or between 10 and 20 RPM. However, any other increment may be used.

As the engine speed increases, the air compressor 38 adds air to the air storage tank 204 at incrementally faster rates, until the rate of change of the air pressure no longer satisfies the threshold rat. For example, when the air compressor 38 is adding at least as much air to the air storage tank 204 as is being used by the pneumatic tool (or otherwise exiting the air storage tank 204), the control circuitry 208 may stop increasing the speed of the engine 32, However, other thresholds may be used, such as a rate that adds air pressure at a predetermined amount per unit time.

When the air pressure in the air storage tank 204 reaches an air pressure limit (e.g., user-defined, default, etc.), the control circuitry 208 decreases the speed of the engine 32. For example, the control circuitry 208 may decrement the speed of the engine 32 and/or reduce the speed of the engine 32 to the idle speed (e.g., subject to other loads on the engine 32, such as the switched-mode power supply 202 and/or AC auxiliary power loads).

Additionally or alternatively to incrementing the engine speed based on the air compressor load, the example control circuitry 208 may control the speed of the engine 32 based on the input current to the switched-rode power supply 202, As the load on the switched-mode power supply 202 increases, the boost converter 212 draws a larger current from the generator 34 to maintain a target bus voltage (e.g., an input voltage to the inverter 214). The example power system 200 includes a current sensor 224 (e.g., an ammeter, a current transformer, etc.) configured to measure an input current to the switched-rode power supply 202, In some examples, the current sensor 224 monitors the rectified current input to the boost converter 212.

When the measured input current increases above a threshold current, the example control circuitry 208 increases a speed of the engine 32, which causes the generator 34 to increase an output voltage to the switched-mode power supply 202, thereby reducing the current. The control circuitry 208 increases the engine speed incrementally until the input current is less than the threshold. Conversely, as the input current to the boost converter drops below a lower threshold, the example control circuitry 208 may decrement the speed of the engine 32 and/or decrease the speed to the idle speed in response to the reduced load.

In some examples, the control circuitry 208 controls the engine speed to be a predetermined engine speed when a load is connected to the AC auxiliary output. The engine speed may be based on an expected AC frequency output by the generator 34 to operate the connected load, such as an AC electrical tool. The presence of the AC auxiliary output load ray override the engine speed based on the air compressor 38 and/or the switched-mode power supply 202.

While example loads are described above, the control circuitry 208 may increment and/or decrement the engine speed based on other loads on the engine 32, such as hydraulic loads.

Figure 3:
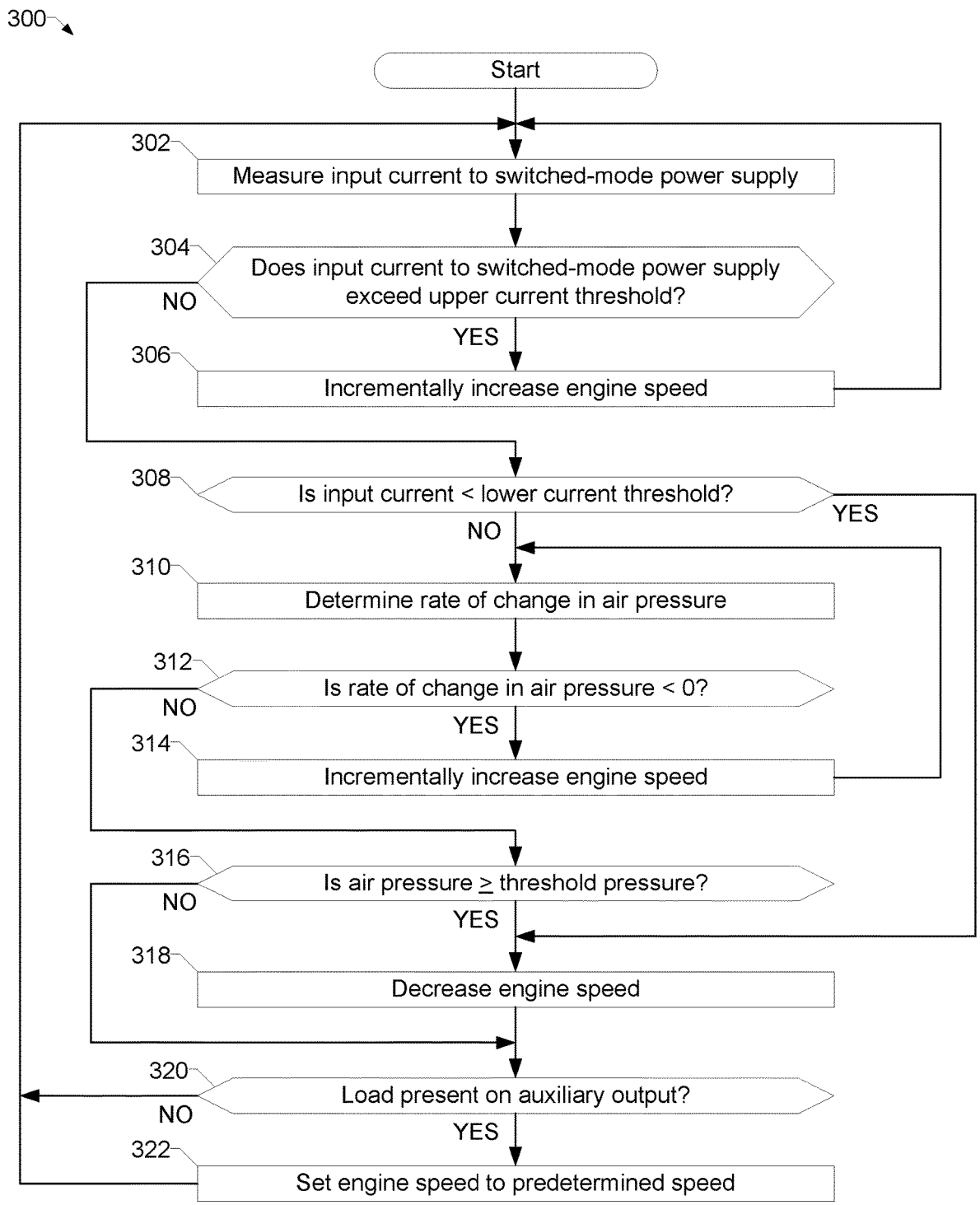
FIG. 3 is a flowchart representative of example machine readable instructions which may be executed by the example control circuitry to control an engine speed of a power system.

FIG. 3 is a flowchart representative of example machine readable instructions 300 which may be executed by the example control circuitry 208 to control an engine speed of a power system (e.g., the power system 200 of FIG. 2). The example instructions 300 will be described with reference to the power system 200 of FIG. 2. The instructions 300 may be executed while the engine 32 is running.

At block 302, the example current sensor 224 measures an input current to the switched-mode power supply 202 (and/or to the boost converter 212). At block 304, the control circuitry 208 determines whether the input current exceeds an upper current threshold. If the input current exceeds the current threshold (block 304), at block 306 the control circuitry 208 incrementally increases the speed of the engine 32. Example increments may be between 1 and 100 rotations per minute (RPM), between 10 and 50 RPM, and/or between 10 and 20 RPM. However, any other increment may be used. Control returns to block 302 to continue to measure the input current.

If the input current does not exceed the current threshold (block 304), at block 308 the control circuitry 208 determines whether the input current is less than a lower current threshold.

If the input current is not less than the lower current threshold (block 308), at block 310 the control circuitry 208 determines a rate of change in air pressure in the air storage tank 204. For example, the control circuitry 208 may determine the rate of change of the air pressure based on pressure samples received from the pressure transducer 206. At block 312, the control circuitry 208 determines whether the rate of change in air pressure is less than 0 (e.g., whether the air pressure in the air storage tank 204 is dropping). However, another threshold may be used. If the rate of change in air pressure is less than 0 (block 312), at block 314 the control circuitry 208 incrementally increases the engine speed, Control then returns to block 310 to continue to monitor the change in air pressure.

If the rate of change in air pressure is at least 0 (block 312), at block 316 the control circuitry 208 determines whether the air pressure in the air storage tank 204 is at least a threshold pressure. If the air pressure is at least the threshold pressure (block 316), or if the input current is less than the lower threshold current (block 308), at block 318 the control circuitry 208 decreases (e.g., decrements) the speed of the engine 32. The decrement may be the same or different than the increment. In some examples, the control circuitry 208 decreases the engine speed to the idle speed.

After decreasing the engine speed (bock 318), or if the air pressure is not at least the threshold pressure (block 316), at block 320 the control circuitry 208 determines whether a load is present on an auxiliary (e.g., AC) output. If a load is present on the auxiliary output (block 320), at block 322 the control circuitry 208 sets the engine speed to a predetermined speed, such as a speed that provides a desired AC frequency to an AC load. After setting the engine speed (block 322), or if a load is not present on the auxiliary output (block 320), control returns to block 302.

It should be noted that certain applications may call for electrical power from the service pack and compressed air only, without a need for hydraulic service. On the contrary, other applications may call for electrical power and hydraulic service, without the need for compressed air. Applications of the latter type may include manlifts, bucket trucks and the like. In such cases, disclosed examples may include integration of the service pack support systems with those of the main vehicle power plant, but without either the air compressor or the hydraulic pump, and the ancillary components used to support those elements, such as hoses, conduits and so forth.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein. "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or Z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system, comprising:
   an engine;
   a generator coupled to the engine and configured to generate an AC auxiliary output based on a speed of the engine;
   an air compressor configured to generate and store air pressure in an air storage tank based on mechanical power provided by the engine; and
   control circuitry configured to:
   monitor the air pressure in the air storage tank;
   determine a rate of air pressure change based on the monitoring of the air pressure;
   in response to the rate of air pressure change satisfying a threshold rate, incrementally increasing the speed of the engine;
   detecting a load on the AC auxiliary output; and
   in response to detecting the load on the AC auxiliary output, overriding an engine speed that is set based on the air compressor by controlling the speed of the engine to be a predetermined speed to output a predetermined frequency.

2. The power system as defined in claim 1, wherein the control circuitry is configured to incrementally increase the speed of the engine in increments between 1 and 100 revolutions per minute.

3. The power system as defined in claim 2, wherein the control circuitry is configured to incrementally increase the speed of the engine in increments between 10 and 50 revolutions per minute.

4. The power system as defined in claim 3, wherein the control circuitry is configured to incrementally increase the speed of the engine in increments between 10 and 20 revolutions per minute.

5. The power system as defined in claim 1, further comprising a pressure transducer to repeatedly measure the air pressure in the air storage tank at a sampling interval.

6. The power system as defined in claim 1, wherein the rate of air pressure change comprises a rate of air pressure drop, the control circuitry configured to increase the speed of the engine until the rate of air pressure drop is less than the threshold rate.

7. The power system as defined in claim 6, wherein the threshold rate comprises 0 pounds per square inch of pressure drop per unit time.

* * * * *